(12) United States Patent
Geng

(10) Patent No.: US 7,221,809 B2
(45) Date of Patent: May 22, 2007

(54) FACE RECOGNITION SYSTEM AND METHOD

(75) Inventor: Z. Jason Geng, Rockville, MD (US)

(73) Assignee: Genex Technologies, Inc., Bethesda, MD (US)

(*) Notice: Subject to any disclaimer, the term of this patent is extended or adjusted under 35 U.S.C. 154(b) by 516 days.

(21) Appl. No.: 10/322,315

(22) Filed: Dec. 17, 2002

(65) Prior Publication Data

US 2003/0123713 A1    Jul. 3, 2003

Related U.S. Application Data

(60) Provisional application No. 60/341,627, filed on Dec. 17, 2001, provisional application No. 60/370,997, filed on Apr. 9, 2002.

(51) Int. Cl.
*G06K 9/36* (2006.01)

(52) U.S. Cl. .................. 382/280; 382/118; 345/419

(58) Field of Classification Search ............... 382/103, 382/106, 107–109, 115–118, 154, 318, 278, 382/280–285, 274, 255, 219, 189, 182; 345/418–419; 348/448, 208.4, 50, 51, 207.99, 207.1, 207, 348/207.2; 352/57

See application file for complete search history.

(56) References Cited

U.S. PATENT DOCUMENTS

| 5,929,918 | A  | * | 7/1999  | Marques Pereira et al. . | 348/448 |
| 6,044,168 | A  | * | 3/2000  | Tuceryan et al. ......... | 382/118 |
| 6,381,346 | B1 | * | 4/2002  | Eraslan .................. | 382/118 |
| 6,496,594 | B1 | * | 12/2002 | Prokoski ................ | 382/118 |
| 6,556,196 | B1 | * | 4/2003  | Blanz et al. ............ | 345/419 |
| 6,611,629 | B2 | * | 8/2003  | Bender et al. ........... | 382/278 |
| 6,633,655 | B1 | * | 10/2003 | Hong et al. ............. | 382/118 |
| 6,901,161 | B1 | * | 5/2005  | Wakashiro .............. | 382/154 |

* cited by examiner

*Primary Examiner*—Matthew C. Bella
*Assistant Examiner*—Seyed Azarian
(74) *Attorney, Agent, or Firm*—Steven L. Nichols; Rader, Fishman & Grauer PLLC

(57) ABSTRACT

A method of automatically recognizing a human face includes developing a three-dimensional model of a face; and generating a number of two-dimensional images based on the three-dimensional model. The generated two-dimensional images are then enrolled in a database and searched against an input image to identifying the face of the input image.

9 Claims, 13 Drawing Sheets

Fig. 5
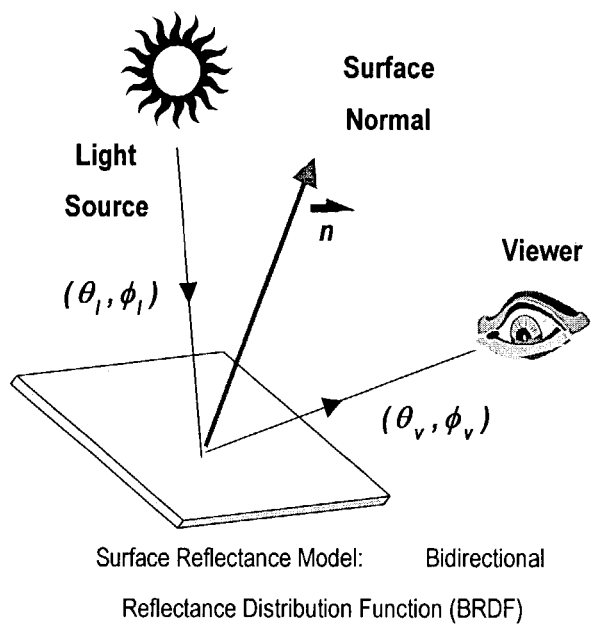
Surface Reflectance Model: Bidirectional Reflectance Distribution Function (BRDF)
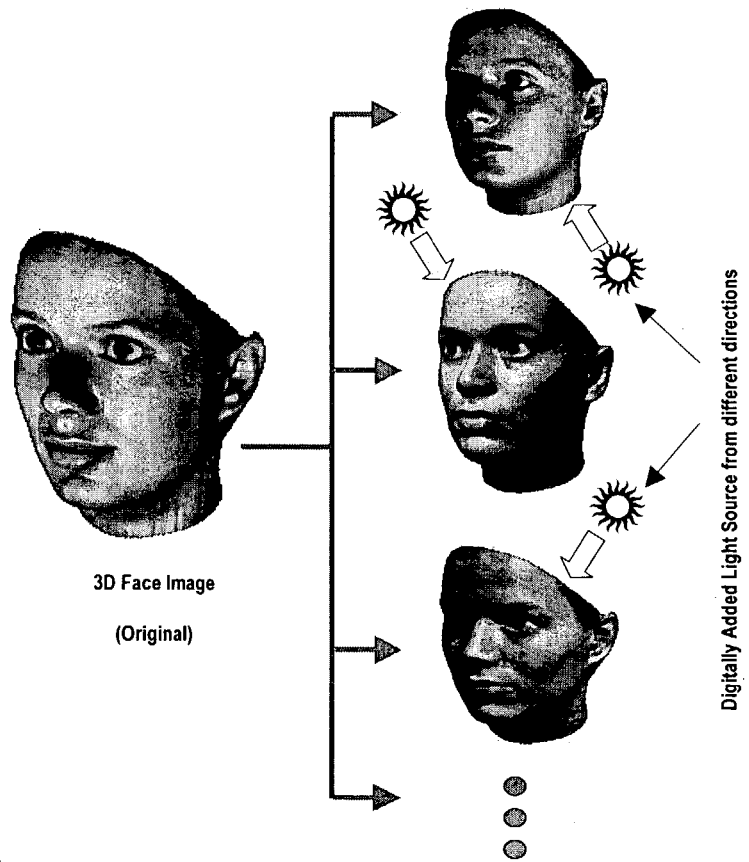
Fig. 6
3D Face Image (Original)
Digitally Altered Face Images with Different Lighting Conditions.

Fig. 9
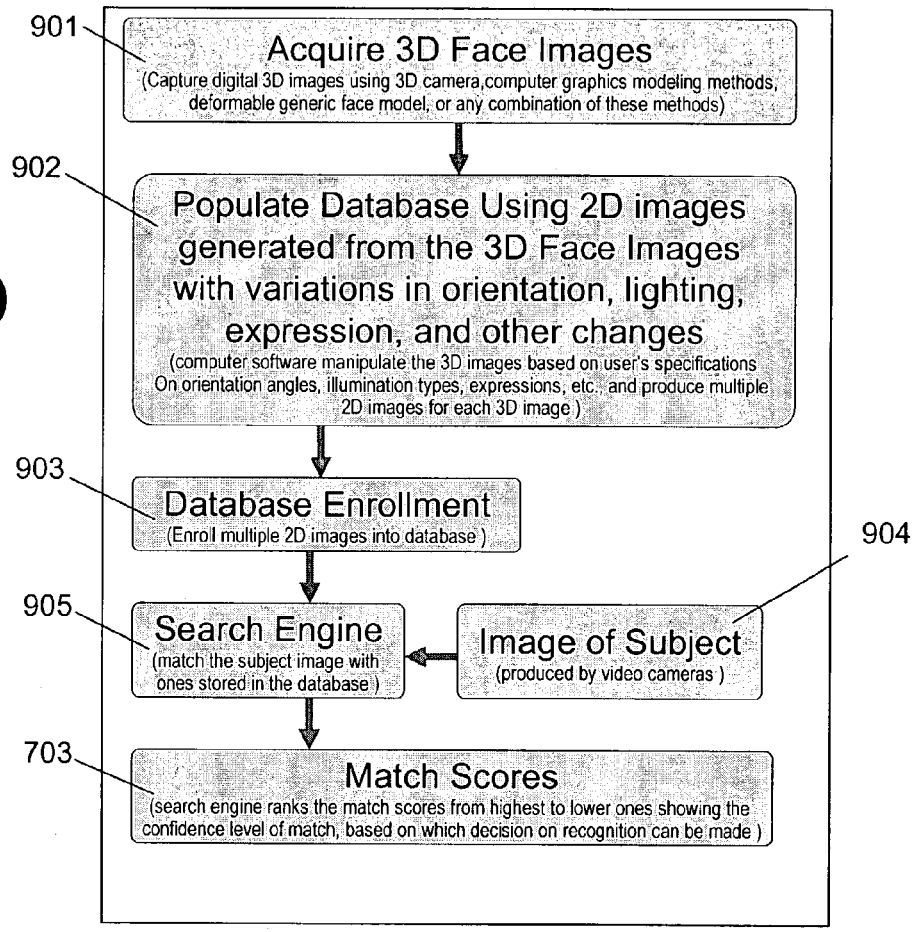
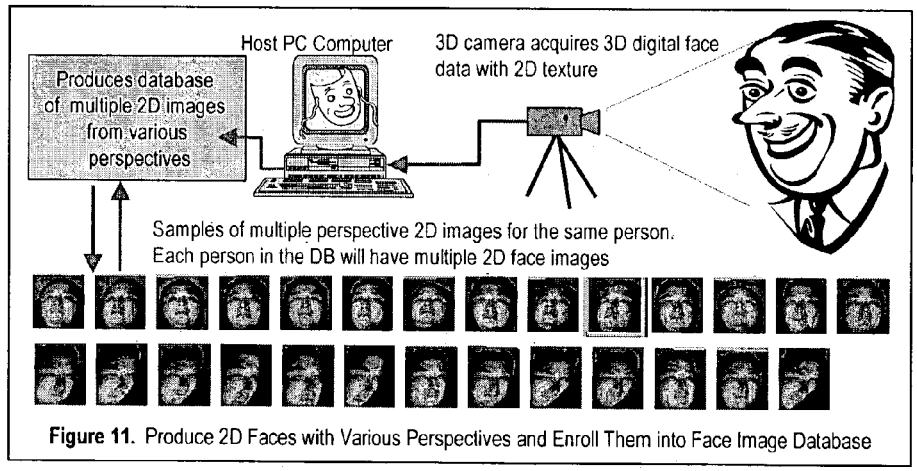
Figure 11. Produce 2D Faces with Various Perspectives and Enroll Them into Face Image Database
Fig. 10

| Normal Vectors | $(r_1, \alpha_1, \beta_1)$ | $(r_2, \alpha_2, \beta_2)$ | $(r_3, \alpha_3, \beta_3)$ | ... |
|---|---|---|---|---|
| $n_1 = (\varphi_1, \theta_1)$ | $(r_1(n_1), \alpha_1(n_1), \beta_1(n_1))$ | $(r_2(n_1), \alpha_2(n_1), \beta_2(n_1))$ | $(r_3(n_1), \alpha_3(n_1), \beta_3(n_1))$ | ... |
| $n_2 = (\varphi_2, \theta_2)$ | $(r_1(n_2), \alpha_1(n_2), \beta_1(n_2))$ | $(r_2(n_2), \alpha_2(n_2), \beta_2(n_2))$ | | |
| $n_3 = (\varphi_3, \theta_3)$ | $(r_1(n_3), \alpha_1(n_3), \beta_1(n_3))$ | $(r_2(n_3), \alpha_2(n_3), \beta_2(n_3))$ | | |
| $n_4 = (\varphi_4, \theta_4)$ | $(r_1(n_4), \alpha_1(n_4), \beta_1(n_4))$ | $(r_2(n_1), \alpha_2(n_4), \beta_2(n_4))$ | $(r_3(n_4), \alpha_3(n_4), \beta_3(n_4))$ | ... |
| ... | | | | |
| $n_{m-1} = (\varphi_{m-1}, \theta_{m-1})$ | | | | |
| $n_m = (\varphi_m, \theta_m)$ | | | | |

Fig. 14

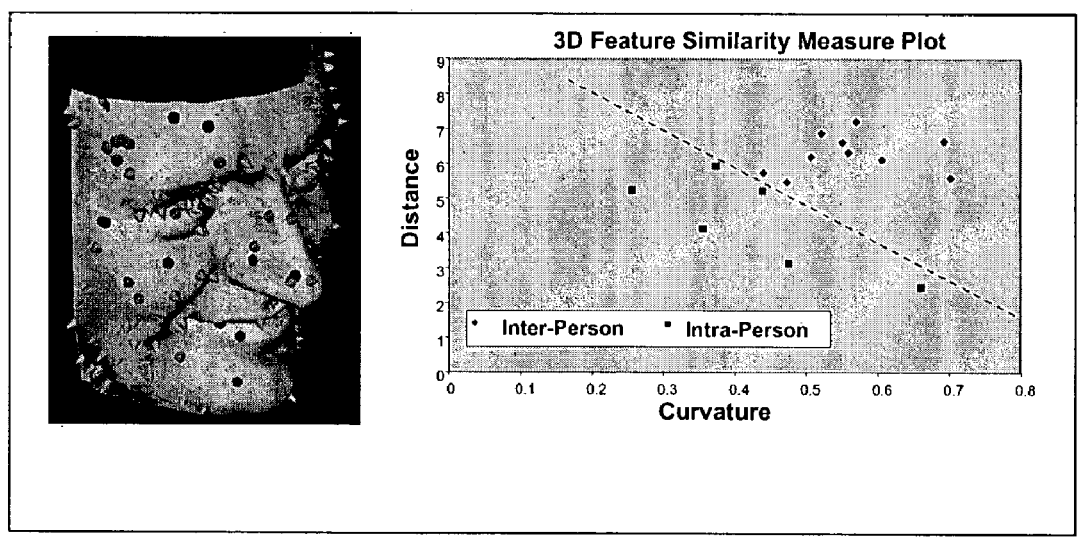

Fig. 15

(a) Selection of Fiducial Facial Feature Points (b) Deformable Generic 3D Face Model (c) Deform the 3D model to fit the shape of 2D photo Define the Propagation Area based on "link" length Define the Propagation Area by Euclidian Distance (a) Fuzzy Weight Function (b) Seamless Transition Around Boundry

FACE RECOGNITION SYSTEM AND METHOD

RELATED APPLICATIONS

The present application claims priority under 35 U.S.C. § 119(e) from the following previously-filed Provisional Patent Applications, U.S. Application No. 60/341,627, filed Dec. 17, 2001, entitled "A Novel Video Surveillance Identification (VSID) System for Preventing Terrorist Attacks," and U.S. Application No. 60/370,997, filed Apr. 9, 2002, entitled "three-dimensional Face Identification Technology." Both of these applications are hereby incorporated by reference in their entireties.

TECHNICAL FIELD

The present invention relates to the field of automatic face recognition systems and methods. The invention has application in, for example, the fields of security and surveillance.

BACKGROUND

Humans have a remarkable ability to identify faces in a rapid and seemingly effortless fashion. It develops over several years of childhood and results in the intelligence to recognize thousands of faces throughout our lifetime. This skill is quite robust, and allows us to correctly identify others despite changes in appearance, like aging, hairstyle, facial hair, and expression. It is also unaffected by the face orientation and lighting conditions.

For decades, building an automatic electronics system to duplicate human face identification capability has been a fascinating goal for many academic researchers and commercial companies around the world. Various attempts in the past were hampered by a lack of appropriate image acquisition means, efficient face identification algorithms with required accuracy, and computation power that implements these algorithm in real-time. To date, existing face identification systems have not been as successful or widely applied as would be desired.

Fundamentally, the human face is a three-dimensional (three-dimensional) object, and each face has its unique three-dimensional geometric profile. Almost all existing face identification systems, however, use only two-dimensional face images as their input. The two-dimensional facial images are inherently vulnerable to changes in light condition and face orientation. Facial recognition techniques based on two-dimensional images are also not robust in dealing with varied facial expressions.

Thus, some limitations of the existing two-dimensional face identification techniques include: (1) vulnerability to changes in face orientation (<±15°); (2) vulnerability to changes in illumination condition; (3) vulnerability to changes in facial expressions; (4) requires cooperative subjects, otherwise the face image acquired may be off-angle. Each of these factors decrease the accuracy of matching an input face against a face database.

These fundamental restrictions prevent current face identification systems from effectively and reliably performing face recognition in field-deployable conditions. As a result, the successful match-rate for existing face identification systems in real-world applications is typically very low (below 90%).

The typical two-dimensional recognition systems include a suite of software that compares two-dimensional surveillance pictures with a database of two-dimensional facial images and ranks matches between surveillance pictures and database images based on a scoring system. The theory is that the higher the score of two-dimensional image matching, the greater the probability that there is a 'match' of the human subject.

Although such systems use different approaches to sorting faces and narrowing the possible matches, they all rely on being able to match key facial features with baseline images stored in a face image database. And, although such systems can map and identify more than one hundred features on each face, with fewer than 20 feature matches a successful match is highly unlikely.

Traditional two-dimensional face recognition systems often claim relatively high accuracy rates (in excess of 95%), but these rates are achieved under very controlled conditions. Only if both the database and surveillance images are taken from the same straight-on angle and with consistent lighting and facial expression, is such accuracy possible. If the image captured by a surveillance camera has an angle from the side, above or below the subject, or if the lighting conditions are significantly different from the database pictures, accuracy rates drop dramatically.

These limitations on the orientation and illumination mean that the use of facial recognition must be limited to access control points where a cooperative subject is standing still, facing the camera, and lighting is controlled. Furthermore, the matching program is looking for known suspects. If an individual has not yet been identified as a suspected person or if the existing photos of their face are not straight on or under good lighting conditions, then the probability of finding a match drops significantly.

A series of recent studies carried out by U.S. Army, Department of Justice and the National Institute of Standards and Technology (NIST) suggest that using three-dimensional face shape features in a face identification system could potentially increase matching accuracy and recognition speed. However, the approaches considered in these studies still could not solve the deterioration of performance under changes in facial orientation, lighting conditions, and facial expression.

The facial images captured by real-world surveillance cameras are usually not in fore-frontal orientation (i.e., straight on) and are usually not captured in evenly illuminated conditions. Most of them have quite large side-view and/or top-view angles, and lighting sources are usually from ceiling or sideways thus an evenly illuminated facial image is hard to get. Additionally, the expression of the human face varies constantly. Comparing facial images capture at an off-angle and in poor lighting with facial images taken fore-frontally in well lit conditions, (i.e., images in a database) would certainly result in a quite high recognition error rate.

Attempts have been made by researchers to store images of the same subject captured from multiple viewing perspectives. The practical dilemma of this approach is that collecting multiple images of the same subject is a lengthy and costly operation. Furthermore, it is difficult to collect multiple images to cover the possible range of side-view and top-view angles and various lighting conditions.

SUMMARY

In one of many possible embodiments, the present invention provides a method of automatically recognizing a human face by developing a three-dimensional model of a face; and generating a number of two-dimensional images based on the three-dimensional model. The generated two-dimensional images are then enrolled in a database and searched against an input image to identifying the face of the input image.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIG. 5 shows the basic relationship and the bi-directional reflectance distribution function (BRDF) definition.

FIG. 6 illustrates the concept of generating multiple face images under various lighting conditions from a single three-dimensional face model according to an embodiment of the present invention.

FIG. 9 illustrates a method of creating and using a face recognition database according to an embodiment of the present invention.

FIG. 10 illustrates an experiment performed using an embodiment of the present invention.

FIG. 14 is an example of an R-Table for 3D GHT

FIG. 15 shows a set of results of three-dimensional face feature (fiducial points) extraction based on the Gabor transform and comparison based on three-dimensional-GHT according to an embodiment of the present invention.

Throughout the drawings, identical reference numbers designate similar, but not necessarily identical, elements.

DETAILED DESCRIPTION

Disclosed herein is a revolutionary new approach for face identification based on three-dimensional imaging technology. The three-dimensional features (such as length of nose, surface profile of chin and forehead, etc.) on a human face can be used, together with its two-dimensional texture information, for a rapid and accurate face identification.

The system is able to compare a subject image acquired by surveillance cameras to a database that stores two-dimensional images of faces with multiple possible viewing perspectives, different expressions and different lighting conditions. These two-dimensional face images are produced digitally from a single three-dimensional image of each face via advanced three-dimensional image processing techniques. This scheme will greatly reduce the difficulty for face-matching algorithms to determine the similarity between an input facial image and a facial image stored in the database, thus improving the accuracy of face recognition, and overcoming the orientation, facial expression and lighting vulnerabilities of current two-dimensional face identification algorithms.

Currently, there is no other technology that is able to solve the orientation variance and lighting condition variance problems for face identification systems. The proposed three-dimensional face identification concept is able to significantly advance the biometric identification system technology and expand its uses.

A preferred means of acquiring the three-dimensional images used to generate the two-dimensional image database is disclosed, for example, in U.S. Pat. No. 5,675,407, issued Oct. 7, 1997 to Geng; U.S. Pat. No. 6,147,760, issued Nov. 14, 2000 to Geng and U.S. Pat. No. 6,028,672, issued Feb. 2, 2000 to Geng; U.S. Provisional Patent Application No. 60/178,695, filed Jan. 28, 2000, entitled "Improvement on the 3D Imaging Methods and Apparatus;" U.S. Provisional Patent Application No. 60/180,045, filed Feb. 3, 2000, entitled "A High Speed Full-Frame Laser 3D Imager;" U.S. patent application Ser. No. 09/617,687 filed Jul. 17, 2000, entitled "Method & Apparatus for Modeling Via A 3D Image Mosaic System;" U.S. patent application Ser. No. 09/770,124, filed Jan. 26, 2001, entitled "3D Surface Profile Imaging Method & Apparatus Using Single Spectral Light Condition;" and U.S. patent application Ser. No. 09/777,027, filed Feb. 5, 2001, entitled "High Speed 3D Imager." All of which are incorporated herein by reference in their entireties.

Figure 1:
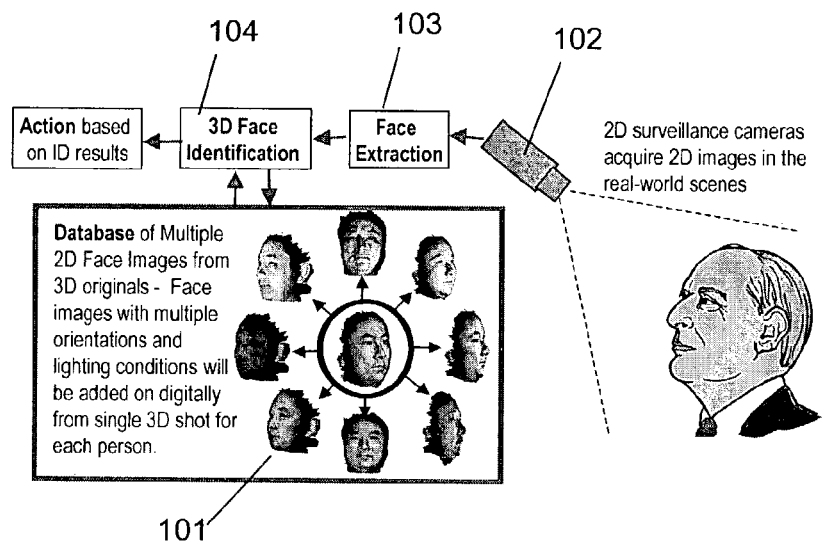
FIG. 1 illustrates an automated facial recognition system according to one embodiment of the present invention.
Figure 3:
FIG. 3 is an example of the 3D Orientation Software Module according to an embodiment of the present invention.

FIG. 1 illustrates the proposed face identification scheme. Given a three-dimensional facial image, we use three-dimensional rendering software to manipulate the lighting conditions, facial expression and orientation of a three-dimensional facial image through a specific set of pan, tilt and rotation angles, and generate a set of two-dimensional facial images with multiple orientation angles. The resulting database (101) of two-dimensional images (See FIG. 3) is then used in automated facial recognition.

A two-dimensional surveillance camera (102) provides an input image. Software (103) extracts the subject face from the input image. The extracted face is then compared against the database (101) by a search engine (104). Action can then be taken appropriately if the extracted face matches one of the various images in the database (101).

Figure 2:
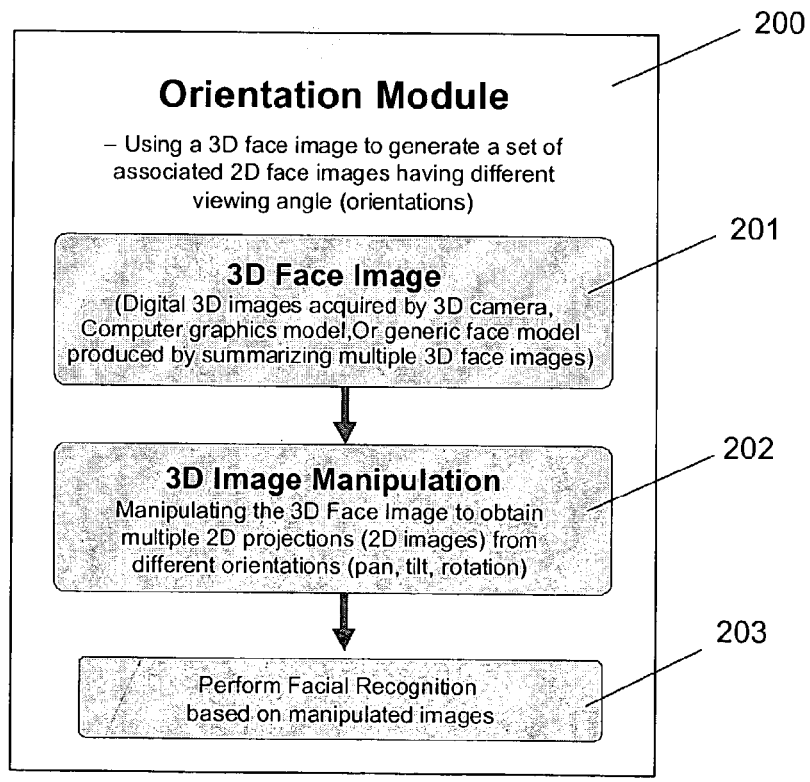
FIG. 2 illustrates a software module for, and method of, providing face images in different orientations according to an embodiment of the present invention.
Figure 4:
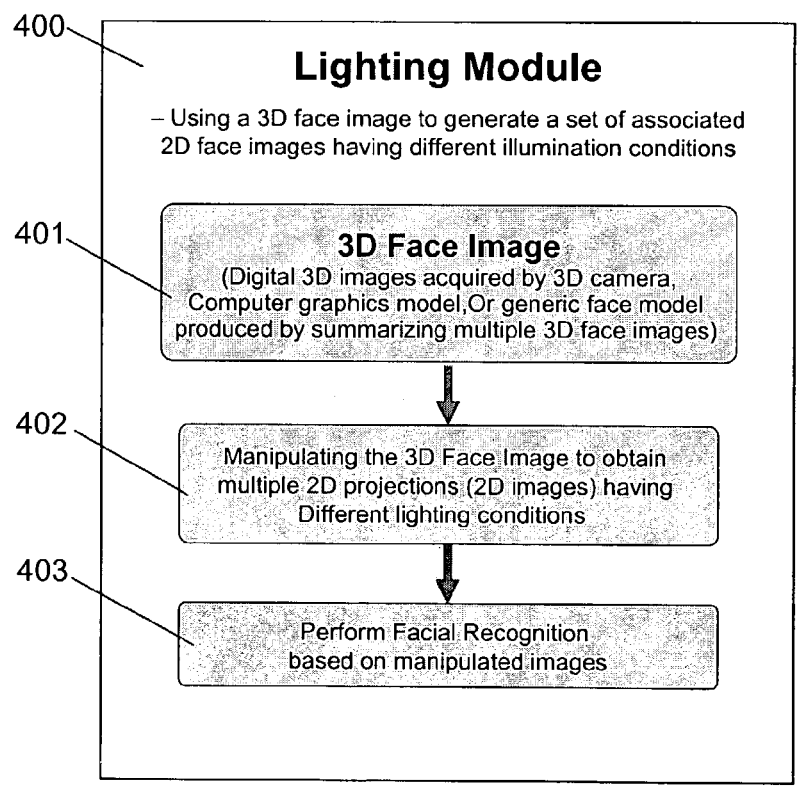
FIG. 4 illustrates a software module for, and method of, providing face images in various lighting conditions according to an embodiment of the present invention.

The method of creating the database (101) of this system is illustrated in FIGS. 2 and 4. FIG. 2 illustrates a lighting module (200) of the database creation software. As shown in FIG. 2, a three-dimensional facial image is first acquired (201). The three-dimensional facial image can be any type of three-dimensional images, such those acquired by three-dimensional cameras, scanners, or digitizers, or produced via computer graphics approaches. The three-dimensional facial image can also be processed images, such as the "Eigen Face" image produced by summarizing multiple facial images.

Multiple two-dimensional images of the same person are then generated by virtually placing the three-dimensional original face model at the center of the world coordinate system, and moving the virtual viewer's position in various pan and tilt angles, as well as rotating the viewer's field of view with respect to the world coordinate system (202). The resulting set of two-dimensional facial images (shown, for example, in FIG. 3) represents a collection of possible two-dimensional images of the person viewed from different angles.

Automated facial recognition (203) can then be performed using the resulting database (101, FIG. 1) of two-dimensional images. This is described above in connection with FIG. 1.

One great advantage of acquiring a three-dimensional digital face model vs. a two-dimensional face image for a subject to use in creating the face identification image database is that all three-dimensional geometric information of the face profile is preserved so that we can artificially manipulate the facial expression, viewing angle and illumination source(s) to generate multiple simulated face images under conditions—all from single original three-dimensional digital face model. The multiple face images are generated based on the three-dimensional face geometry, surface reflectance function, location and strength of the added light source(s), and original high-resolution texture map. In contrast, in a two-dimensional face image, it is impossible to create any geometric-based lighting appearance because of the lack of three-dimensional information.

FIG. 4 shows the flowchart of the three-dimensional lighting module (400) software for facial identification applications. As shown in FIG. 4, the three-dimensional model of each face is acquired (401). Then, the three-dimensional model is digitally manipulated to account for various different lighting conditions (402). The two-dimensional images produced under various lighting conditions are added to the database (101, FIG. 1). Facial recognition can then be performed (403) with the lighting conditions of the input image having a substantially reduced impact on the system's ability to make accurate facial identifications.

The three-dimensional face identification matching algorithms (403) could select images for search that have the similar illumination patterns to the input image. Thus, the matching efficiency and accuracy of the system will be increased greatly. Because these simulated face images have a variety of appearances, the face identification matching algorithms may be able to find a correct match for a poorly-lit subject image that was previously not possible for the search-engine match based on a single two-dimensional face image.

A challenging problem is to create three-dimensional face images with various light illumination conditions based on a single three-dimensional model and its texture information. The traditional approach of mapping a two-dimensional face photo onto a three-dimensional geometric model can only provide one illumination condition. It usually fails to appear realistic under changes in lighting, viewpoint, and expression. The problem is that the reflectance properties of the face are complex: skin reflects light both diffusely and specularly. The reflectance varies with spatial locations.

Some embodiments disclosed herein use a unique method to produce various face images based on the "three-dimensional modulation" of the two-dimensional texture map with the three-dimensional reflectance model. FIG. 5 shows the basic relationship and the bi-directional reflectance distribution function (BRDF) definition. The reflectance theory essentially guides us to use computer graphics methods to generate appropriate appearance and shading of a three-dimensional surface based on the surface normal, geometric locations of light source(s) and viewpoint.

FIG. 6 illustrates the concept of generating multiple face images under various lighting conditions from single three-dimensional face model and a few sample examples. We simply combined the two-dimensional texture ($r_i$, $g_i$, $b_i$) information at pixel i with the modulation $m_i$ calculated from the reflectance model based on the three-dimensional geometric shape under the various artificially placed lighting source(s). The final color component at the pixel i becomes $m_i*(r_i, g_i, b_i)$.

Figure 7:
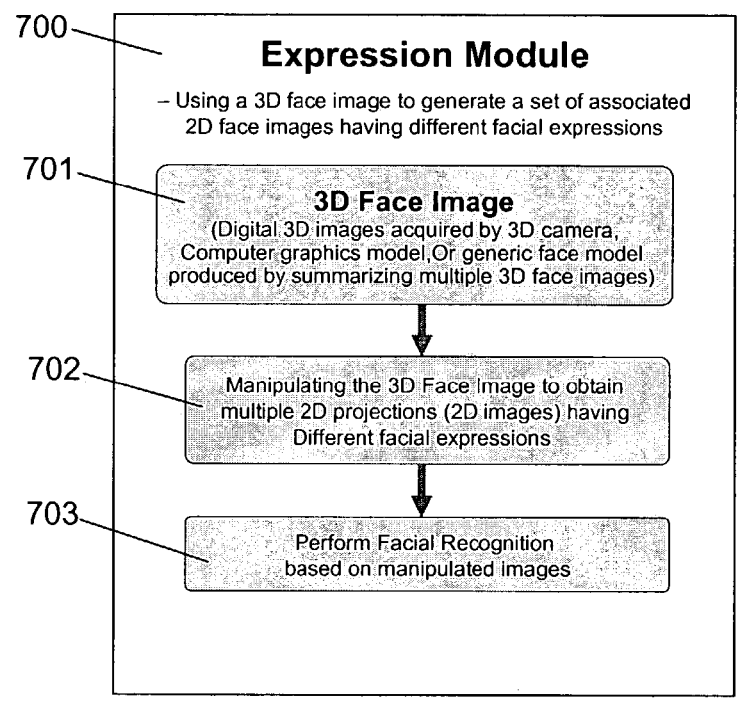
FIG. 7 illustrates a software module for, and method of, providing face images in various expressions according to an embodiment of the present invention.
Figure 8:
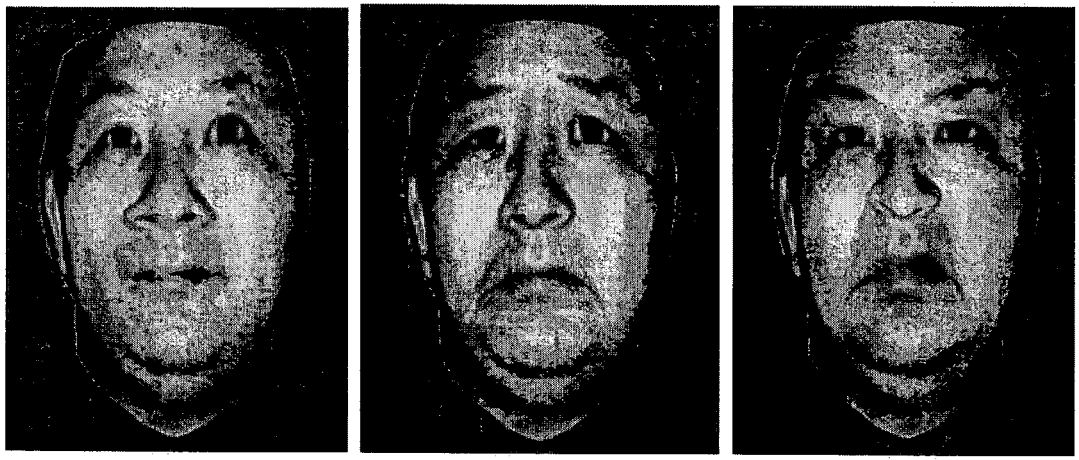
FIG. 8 illustrates some examples of digitally prepared two-dimensional images with different facial expressions based on a three-dimensional model.

Lastly, A three-dimensional based morphing algorithm to produce face image with different expressions. FIG. 7 shows the flowchart of the three-dimensional expression module (700) software for facial identification applications. As shown in FIG. 7, the three-dimensional model of each face is acquired (701). The three-dimensional model is the morphed or deformed to show different facial expressions (702). The three-dimensional image is registered onto a generic three-dimensional deformable model using multiple feature points (such as comers of eyes, nose tip, comers of moth, etc.). The software (700) will then be able to deform the generic model into a subject specific model via the corresponding point registration. After the registration, the deformable model is used to simulation the deformation of the face to show various expressions. FIG. 8 shows a set of examples.

The two-dimensional images produced for various emotions and expressions are added to the database (101, FIG. 1). Facial recognition can then be performed (703) with the facial expression of the input image having a substantially reduced impact on the system's ability to make accurate facial identifications.

In summary, the method and system described use a three-dimensional face image to generate a set of associated two-dimensional face images having different orientations, lightings, facial expressions, and other variations. A searchable database is then created by enrolling these two-dimensional and three-dimensional images into an image library that can be searched with a face identification search engine. Some person's two-dimensional images can be named the same name (e.g., John_Doe) or different names (e.g., John_Doe_001, John_Doe_002, . . . ). The match produced by any one of these two-dimensional images would result in a match of the person corresponding to the original three-dimensional model.

Based on an ear-to-ear three-dimensional face model, we can use the three-dimensional rendering method described herein to produce multiple two-dimensional face images of the same person in different conditions. This will greatly reduce the difficulty for a two-dimensional face-matching algorithm to determine the similarity of a facial image with that stored in the database, since there are many images from multiple perspectives and conditions for the same subject in the database.

The proposed three-dimensional face identification system has two functional phases: the enrollment or database creation phase and the identification phase. Both phases are illustrated in FIG. 9. As shown in FIG. 9, we first acquire three-dimensional facial images or models using a three-dimensional camera (901). This includes acquiring three-dimensional color images of those persons who are supposed to be in the database. Once a three-dimensional facial image is taken, three-dimensional image processing software will be able to process it automatically and generate systematically multiple two-dimensional images from pre-defined number of orientations (perspectives), illumination conditions and/or facial expressions (902). The software will also provide automatic feature location (such as positions of both eyes) and normalize the images to meet the requirements from three-dimensional Face identification algorithms.

Next, the database is enrolled (903), meaning that the various two-dimensional images for each three-dimensional model are associated as identifying a particular subject and are arranged in a searchable format. This completes the enrollment phase.

Then, the identification phase begins when a subject image (904), e.g., a two-dimensional surveillance image, is taken and input to the system. A search engine (905) then seeks for a match between the incoming subject image and an image in the enrolled database. A match may be made based on a score from analyzing the similarities between the subject image and an image from the enrolled database.

In one initial experiment, illustrated in FIG. 10, a database was prepared as described above using a three-dimensional imager and searched using the FaceIt® software search engine of Identix Incorporated, formerly Visionics. (1) First, we acquired three-dimensional face images of 15 individuals using, for example, a three-dimensional camera described in the patents noted above to Geng. (2) We then manually produced 42 frames of two-dimensional images from each three-dimensional original (side-view from –60° to +60°, tilt angle from –50° to +a50°) using a visualization software platform "3D Mosaic®" available from Genex Corp. of Maryland. (3) These images are then enrolled into a NIST two-dimensional face image database with 156 individuals. (4) We then take an image of one of 15 individual we enrolled in the database, and utilize the FaceIt® software search engine of Identix Incorporated to search for a match within the database.

Figure 11:
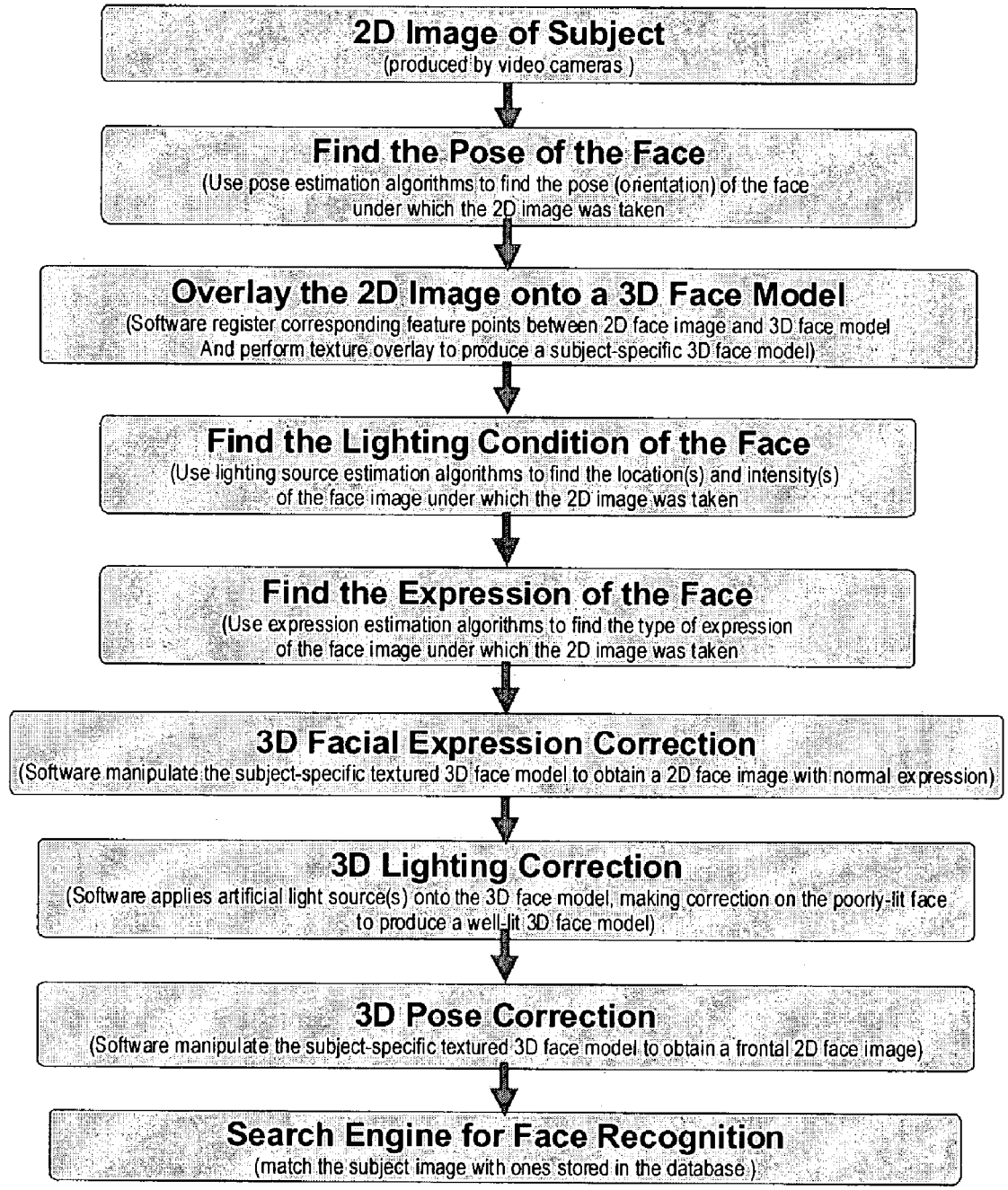
FIG. 11 illustrates a method, according to an embodiment of the present invention, of manipulating a subject image to increase the likelihood of successful identification.

The input image of the subject to be identified can also be manipulated to make it more likely to match an image in the database (101, FIG. 1). For example, given a two-dimensional face image acquired by a video camera, a software correction module performs estimation of the orientation (pose), lighting, and expression, and overlays the two-dimensional image onto the three-dimensional face model to generate a subject-specific three-dimensional facial model. The software can then perform corrections or modifications to pose, lighting and expression. The search to identify the subject is then executed. This entire process is illustrated in FIG. 11.

An alternative and more comprehensive approach to applying the proposed three-dimensional face identification technology is to develop advanced face identification algorithms that are explicitly exploiting the three-dimensional features from three-dimensional images, and locating matches based on these features. We now discuss several key issues related to the proposed three-dimensional face matching algorithm.

Locations of Fiducial Points: In order to match two faces, we have to first find identifying feature points that can be compared. The problem to be solved is how to automatically find feature points on a three-dimensional digital face image? In one solution, we can first apply the Gabor transform to the three-dimensional face image to automatically identify the landmark points on a face for subsequent face matching. The Gabor transform can be defined as a set of filters [M. Lades, et. al., "Distortion Invariant Object Recognition in the Dynamic Link Architecture," IEEE Trans. Comput., vol 42, no. 3, pp. 300–311, March 1993, (incorporated herein by reference)], each with a kernel $h_k(\vec{r})$:

$$h_k(\vec{r}) = \frac{\vec{k}^2}{\sigma^2} \exp\left(-\frac{\vec{k}^2 \vec{r}^2}{2\sigma^2}\right)\left[\exp(j\vec{k}\vec{r}) - \exp\left(-\frac{\sigma^2}{2}\right)\right],$$

where $\vec{r}$ indicates the spatial location and $\vec{k}$ indicates the frequency and orientation of the kernel. This kernel is designed to detect various frequency and orientation components of the image as $\vec{k}$ takes on different values, where $\vec{k} = k_\nu e^{j\Phi_\nu}$.

Figure 12:
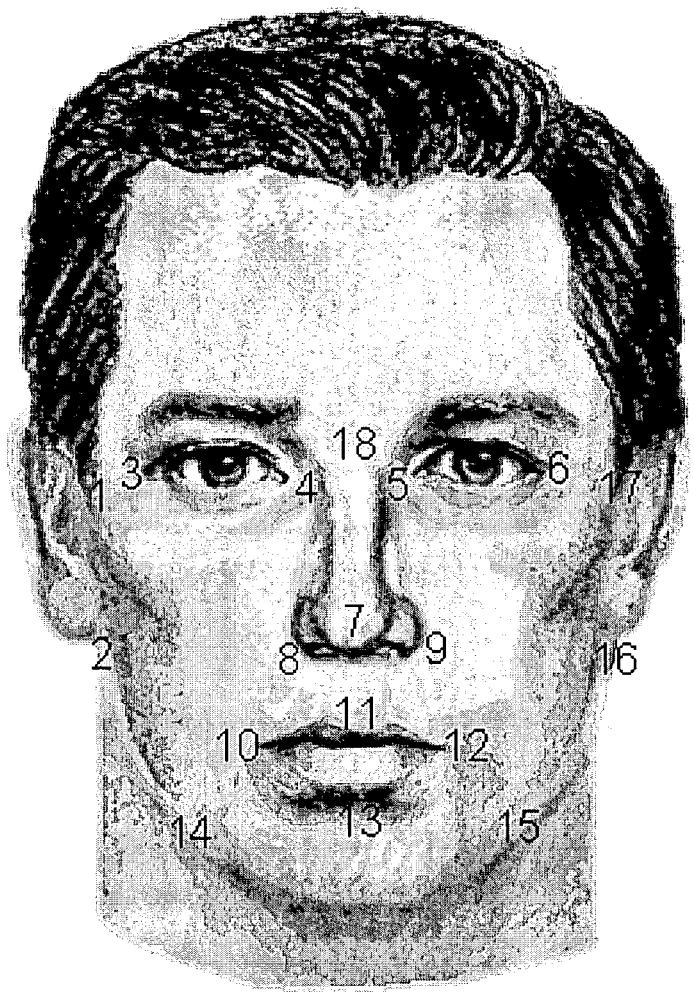
FIG. 12 illustrates fiducial points characterizing a particular face.

In contrast to the conventional Gabor filter applications, where it is operated on gray-scale two-dimensional images, in the proposed three-dimensional-face identification algorithm, the Gabor filter is applied to three-dimensional distance measurements. The result of convolving a Gabor filter with a three-dimensional image is a set of measurements for each pixel of the image. These measurements, referred as the Gabor features, define the shape, size, and orientation of the surface in the neighborhood of that pixel. We establish a set of "feature templates" for face fiducial points using these measurements. Then these Gabor features are calculated for a three-dimensional face image to be recognized. If the calculated Gabor features are sufficiently close to the "feature templates" then the pixel associated with the Gabor features is classified as a fiducial point location. A typical pictorial description of fiducial points is show in FIG. 12.

The feature vectors representing each three-dimensional-face image must have the following key characteristics: all the feature vectors representing the same individual must be "similar" in some sense, and feature vectors representing different individuals must be "dissimilar" in some sense.

We use three components in each feature vector, which are known as the distance feature (DF), angular feature (AF), and local curvature feature (LCF). Although these features seem to be sufficiently discriminative for a small sample set, it is expected that additional features may be introduced when the sample set size is increased to many thousands of individuals. To meet such a challenge, the Gabor features may be used as the additional feature component of the feature vector for representing three-dimensional-face images. Gabor features are defined as the Gabor transform coefficients, which are available at the end of the "feature location" stage because they were used for locating the fiducial points.

Next, an effective feature-matching algorithm for feature vector matching is a three-dimensional Generalized Hough Transform (three-dimensional-GHT). This approach is developed based on the Generalized Hough Transform (GHT) concept proposed by Ballard [D. H. Ballard, "Generalizing the Hough transform to detect arbitrary shapes," Pattern Recognition, vol. 3. no. 2, pp. 111–122, 1981 (incorporated herein by reference it its entirety].

Figure 13:
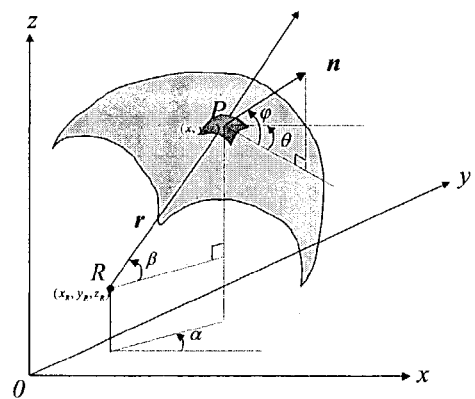
FIG. 13 illustrates a three-dimensional surface (the shaded area) to show the parameters involved in the three-dimensional-GHT algorithms.

The three-dimensional-GHT is to detect a three-dimensional structure (object) that has no simple parametrical characterization, i.e., those three-dimensional subjects that cannot be expressed by an analytical expression. Similar to the R table in the generalized Hough transform proposed by Ballard, the first step of the three-dimensional-GHT constructs an R-table. In FIG. 13, a three-dimensional surface (the shaded area) is depicted to illustrate the parameters involved in the three-dimensional-GHT algorithms. Each point on the surface is denoted as P and its location is at (x, y, z). An example of the R-table for the three-dimensional GHT is shown in FIG. 14.

After the R-table is constructed for a known structure (the template), the three-dimensional-GHT algorithm for detecting a three-dimensional object with the shape specified by the R-table is described below:

Step 1: Form a data structure A (an accumulator) whose indices are the positions of the reference points at $(x_R, y_R, z_R)$. Set all accumulator cell contents to zero, Step 2: For each on the unknown surface that has a normal vector, increase the content of all accumulator cells by a pre-specified amount, $$A(x_R, y_R, z_R) = A(x_R, y_R, z_R) + \Delta A, \text{ provided:}$$

$$x_R = x + r_j(n_k)\cos(\beta_j(n_k))\cos(\alpha_j(n_k)), y_R = y + r_j(n_k)\cos(\beta_j(n_k))\sin(\alpha_j(n_k)), z_R = z + r_j(n_k)\sin(\beta_j(n_k)),$$

where $j = \{1, 2, 3, \ldots, m\}$, and m is the number of pixels whose normal vector are $n_k = (\phi_k, \theta_k)$. The increment, $\Delta A$, in the above expression is proportional to the similarity measure produced by the pixel (x, y, z) on the unknown surface and the pixel on the "template" surface with the same n, r, $\alpha$ and $\beta$. Note that the subscript j for r, $\alpha$ and $\beta$, and indicates that the about three expression have to be evaluated for $j = \{1, 2, 3, \ldots, m\}$.

Step 3: The local maxima in the accumulator $A(x_R, y_R, z_R)$ indicate that a match (complete or partial) occurred when the referent point is located at $(x_R, y_R, z_R)$ for the unknown surface.

The above formulation of the three-dimensional-GHT does not take the rotation and scaling of the unknown surface into consideration. In other words, if the unknown surface is not appropriately aligned with the template (the model), rotation and scaling operations to the model are required to compensate that effect. The following expressions are the modified step 2 of the three-dimensional-GHT algorithm:

$$x_R = x + r_j(n_k) S \cos(\beta_j(n_k) + \tau_\beta)\cos(\alpha_j(n_k) + \tau_\alpha),$$

$$y_R = y + r_j(n_k) S \cos(\beta_j(n_k) + \tau_\beta)\sin(\alpha_j(n_k) + \tau_\alpha),$$

$$z_R = z + r_j(n_k) S \sin(\beta_j(n_k) + \tau_\beta)$$

where $j = \{1, 2, 3, \ldots, m\}$, and m is the number of pixels whose normal vector are $n_k = (\phi_k, \theta_k)$. The scaling and rotating parameters S, $\tau_\alpha$, and $\tau_\beta$ vary in the range that a user specifies. Note that when, S=1, $\tau_\alpha = 0$, and $\tau_\beta = 0$, the two different formulations for finding the coordinates of the reference point become the same.

Experimental Results on the Proposed Three-dimensional Face-Matching Algorithm

We have performed preliminary experiments on the proposed three-dimensional Face identification approach. FIG. 15 shows a set of results of three-dimensional face feature (fiducial points) extraction based on the Gabor transform and comparison based on three-dimensional-GHT. The face model to the left of FIG. 15 shows graphically the points extracted from a three-dimensional face model that can be used to compare with other three-dimensional faces. The graph to the right in FIG. 15 shows a statistical result plot of a small-scale face comparison experiments where a three-dimensional face image is compared with ten three-dimensional images from different persons (Inter-person), and five images of the same person (Intra-person). The similarity measures can clearly distinguish the features and separate them.

Even with large number of face images stored in the image database (101, FIG. 1), we can still use the existing two-dimensional face identification algorithms efficiently. We can group the images according to the orientation and/or illumination. Once a face image is send to the algorithm to search for match, we can first pre-processing the incoming image to classify its orientation and illumination types, then start to the search with the set of database images that match the particular type of incoming image. In this way, the size of the database to be searched could be reduced significantly.

In other words, the orientation and the illumination will be used as a first level "Matching Key" in the database search. The image is then sent to a sub-database for an efficient search for match. This search method will dramatically reduce the search time and make the performance of the three-dimensional face identification approach compatible with real-time applications. Also, with ever-increasing computer speed, the number of images stored in the database will have less and less of an affect the search speed and results.

In addition to the methods and means mentioned above for creating the three-dimensional face models, there are also techniques that can be described for generating three-dimensional face models based on a two-dimensional video stream or a still picture of a subject. The proposed approach has two separate steps (1) Establish a generic facial mesh model that preserves accurate deformation properties while facilitating an acceptable computation speed. (2) Customize the generic facial mesh model using subject-specific image data.

With certain level of approximation, a face can be modeled by a mass-spring mesh consisting of sufficient nodes (point masses) and links (connecting springs). The number of points and the connecting configuration of links will be determined by the generic shape of the human face. Highly curved area and areas will have finer triangles to represent that complex shape while more flattened areas will be represented by less number of nodes and larger triangles. Comparing with raw three-dimensional image data, such a generic facial model results in efficient three-dimensional shape representation.

The spring forces will be linear (Hookean) or nonlinear (elastic behavior). In a dynamic system, Newton's Second Law governs the motion of a single mass point in the lattice:

$$m_i \ddot{x}_i = -\gamma_i \dot{x}_i + \sum_j p_{ij} + f_i$$

Here, $m_i$ is the mass of the point, $x_i \in \Re^3$ is its position, and the terms on the right-hand side are forces acting on the mass point. The first right-hand term is a velocity-dependent damping force, $p_{ij}$ is the force exerted on mass I by the spring between masses i and j, and $f_i$ is the sum of other external forces, (e.g. gravity or user applied forces), acting on mass i.

We further decompose the dynamic tissue model into the following format:

$$m_i \ddot{x}_i = -\gamma_i \dot{x}_i + g_i + h_i + q_i + \sum_j p_{ij} + f_i$$

where $m_i$ is the mass of the node, $x_i \in \Re^3$ is node's position, $\gamma_i$ is the damping coefficient, $g_i$ is the gravity force, $q_i$ is the total volume preservation force at node I, $p_{ij}$ is the force exerted on mass I by the spring between masses i and j, and $f_i$ is the sum of other external forces, (e.g. user applied forces), acting on mass i.

The force spring j exerts on node i is: $p_{ij} = c_j(l_j - l_j^o) s_j$ where $l_j$ and $l_j^o$ are the current and rest lengths for spring j, $s_j = (x_j - x_i)/l_j$ is spring direction vector for spring j.

Volume Preservation Forces: In order to faithfully exhibit the incompressibility of real human face and skin in our model, a volume constraint force based on the change of volume and displacements of nodes will be calculated and applied to nodes. The volume preservation force element e exerts on nodes I in element e is:

$$q_i^e = k_1(V^e - \vec{V}^e) n_i^e + k_2(r^e - \vec{r}^e)$$

where $V^e$ and $\vec{V}^e$ are the rest and current volume for e, $n_i^e$ is the epidermal normal for node I, $r^e$ and $\vec{r}^e$ are the rest and current nodal coordinates with respect to the center of mass of e, $k_1$ and $k_2$ are force scaling factor.

Numerical Simulation Method: The solution to the above dynamic tissue model can be approximated by using the well-known, explicit Euler method. At each iteration, the nodal acceleration at time t is computed by dividing the net force by nodal mass. The nodal velocity is then calculated by integration once, and integration is done to compute the nodal positions at the next time step t+Δt, as follows:

$$a_i^t = \frac{1}{m_i}\left(-\gamma_i v_i^t + g_i^t + h_i^t + q_i^t + \sum_j p_{ij}^t + f_i^t\right)$$

$$v_i^{t+\Delta t} = v_i^t + \Delta t a_i^t, \quad x_i^{t+\Delta t} = x_i^t + \Delta t v_i^{t+\Delta t}$$

Our "video-to-three-dimensional" modeling approach employs a generic facial model with sufficient detail level of features suitable for facial recognition purpose. The three-dimensional model is then deformed to fit to the two-dimensional photograph(s) to obtain a subject-specific three-dimensional face model.

Human faces share common facial features. For example, the facial contour resembles an ellipse, the spatial relationship and shapes of facial organs (eyes, brews, nose, and mouth) are relatively steady. Therefore, a "generic" three-dimensional face model can be established to represent these common features. Geometric deformation can then be performed to "fit" this three-dimensional model to the face profile of a specific subject.

Figure 16:
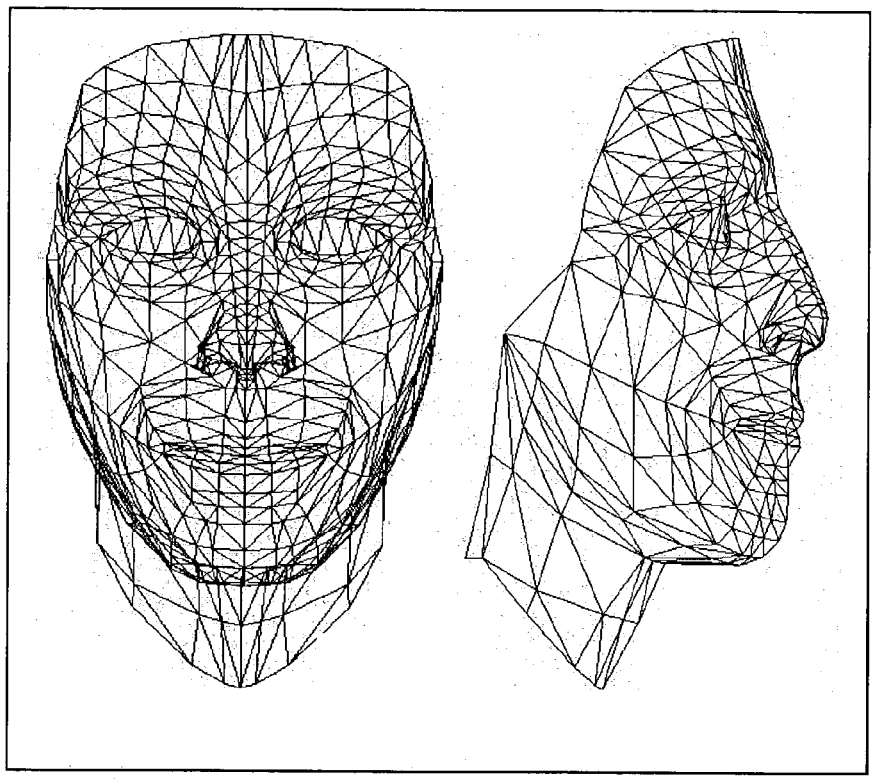
FIG. 16 shows a three-dimensional face model as used in embodiments of the present invention.

A series of three-dimensional polygon models are used to represent three-dimensional geometric profile of human faces. The detail levels of the polygon models can be adjusted to suit for different levels of accuracy requirements. FIG. 16 shows a face model with about 900 facets that can be used by embodiments of the present invention. This set of three-dimensional face models are generated by compressing a three-dimensional face image acquired by a three-dimensional camera to different level of polygon densities, and then manually process the compressed data. Two sides of the face are symmetric and generated by mirroring one side of the facial data.

This existing three-dimensional face model is used to generate a generic deformable three-dimensional face model. We can also extend the generic three-dimensional face model approach by including a statistical average in the generic model of a number of three-dimensional face images acquired by our three-dimensional cameras. This approach allows us to understand the deformation characteristics of the three-dimensional face model and establish a "face space" in which a limited number of parameters will control the deformation and fitting.

The "two-dimensional-to-three-dimensional" Fitting Techniques—fit the generic face model to subject-specific two-dimensional image to obtain three-dimensional face model. Three different scenarios and associated fitting techniques will now be described.

Deform three-dimensional face model based on dual-view two-dimensional images: Assume that two still photos or two frames of video images of a subject can be obtained for the three-dimensional face modeling purpose (see FIG. 17). Using the pose estimation algorithm (to be discussed later in this section), we can obtain the orientation angles (pan, tilt, and rotation) from which the two-dimensional images were taken. The converging angle θ between two poses is then known.

Feature Points Selection: We then establish a set of "feature templates" for face fiducial points using the Gabor analysis [M. Lades, et. al., "Distortion Invariant Object Recognition in the Dynamic Link Architecture," IEEE Trans. Comput., vol 42, no. 3, pp. 300–311, March 1993]. A typical pictorial description of these fiducial points is show in FIG. 21(a). The more feature points are selected, the better fit the three-dimensional face model will be.

Figure 18:
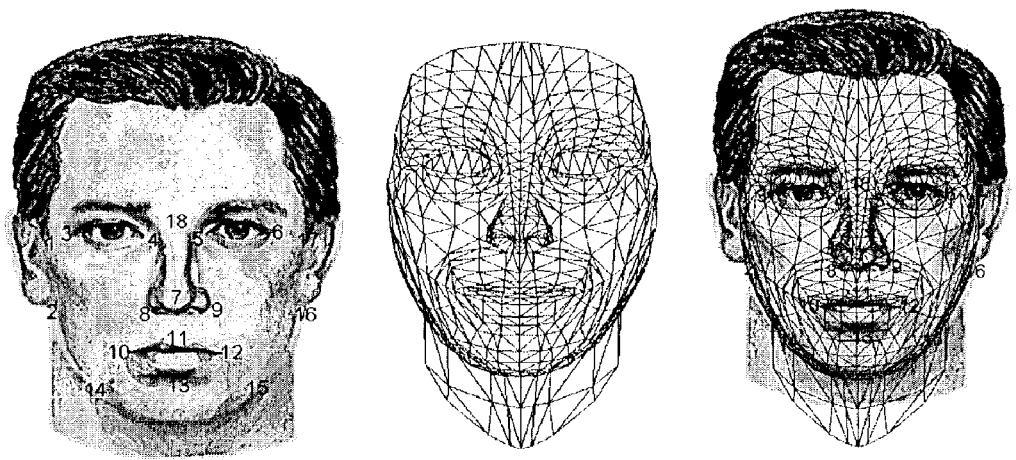
FIG. 18 illustrates a method of using a two-dimensional image to create a three-dimensional facial model according to embodiments of the present invention.

Three-dimensional generic model deformation: We then establish the same number of fiducial points on the generic three-dimensional face model. We then project the generic model into the same pose as one of the two-dimensional photos. Based on the projection geometry, we can use the relative positions among the fiducial points in the two-dimensional photo to determine the locations of the corresponding fiducial points on the three-dimensional face model (along the projection direction of the first two-dimensional image). Using the three-dimensional deformation algorithms discussed below, we can morph the fiducial points and neighboring regions on the three-dimensional model to match the two-dimensional image. The result of this deformation based on the first two-dimensional image is to align all the feature points and their vicinity regions in the similar geometric relationship as the first two-dimensional image. This process is illustrated in FIG. 18.

After the alignment to the first two-dimensional image, we determined the location of any feature point to be on a projection ray defined by the location of Camera 1 (FIG. 17) and the pixel position of the feature on the first two-dimensional image. We the use the projection information from the second two-dimensional image from Camera 2 (FIG. 17) to obtain the depth of all the feature points.

Figure 17:
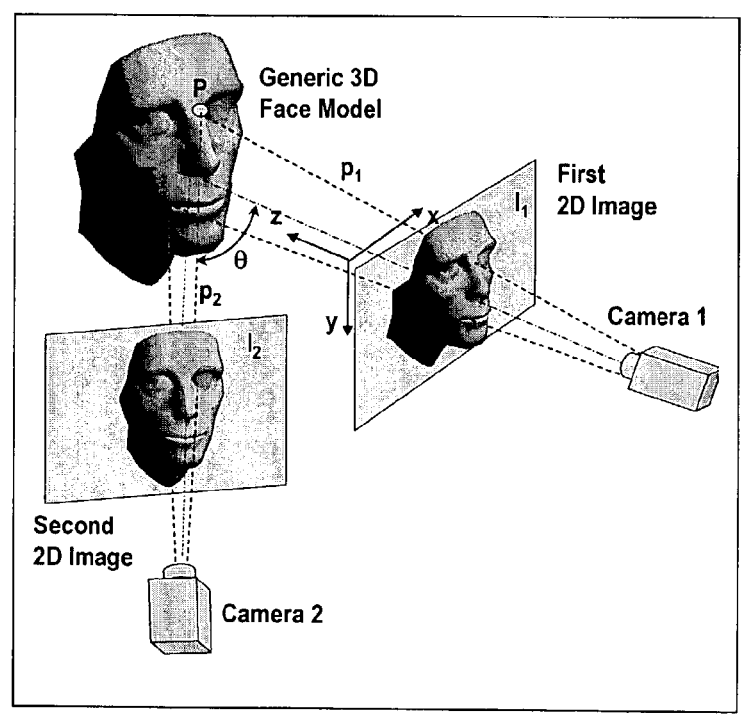
FIG. 17 illustrates the acquisition of multiple two-dimensional facial images for use in a three-dimensional model according to embodiments of the present invention.

As shown in FIG. 17, the second camera, and the image taken by it also define projection geometry. Together with the first camera geometry, the two images form the "Epipolar line" [O. Faugeras, "three-dimensional Computer Vision, a Geometric Viewpoint, MIT Press, 1993]. The projection line associated with a feature point P on the second two-dimensional image (p2) will have to intersect with the projection line (p1) from the first two-dimensional image of the same feature. The three-dimensional depth of the feature point P thus can be uniquely determined.

We use the same deformation technique for the first two-dimensional image to perform the deformation of the three-dimensional model along the Z-axis, based on the alignment information provided by the second two-dimensional image. A fully "conformal" three-dimensional face model is then obtained.

Three-Dimensional Geometry Deformation Algorithm: (1) define the propagation area and (2) compute vertices displacement within propagation area using Gaussian weight function.

Figure 19:
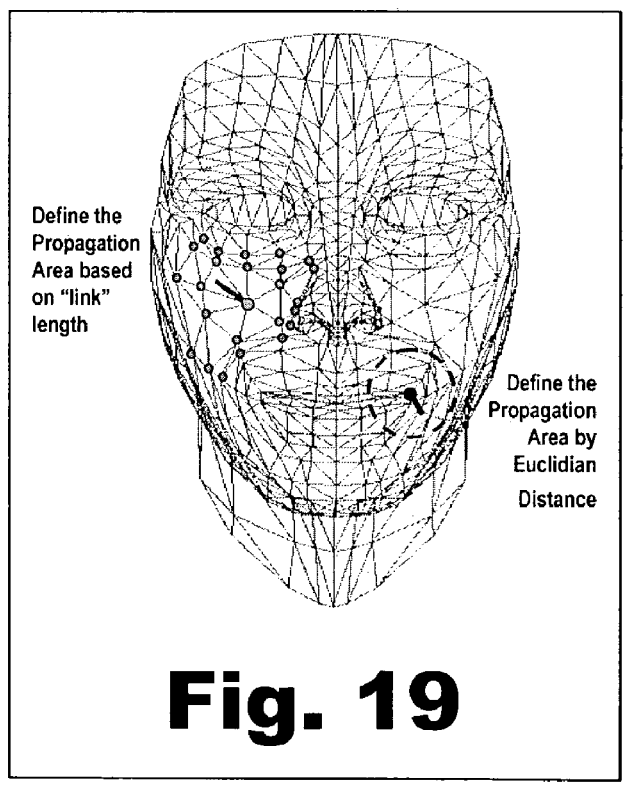
FIG. 19 illustrates the propagation of soft tissue deformation as used in the modeling methods of embodiments of the present invention.

(1) Define the Propagation Area: Facial tissue is soft organ on which a single point deformation propagates to its surrounding areas. The deformation of the three-dimensional face model should follow the similar characteristics of tissue deformation. We use two indexes to define the "propagation area" on facial tissue under a perturbation from single "control point," as shown in FIG. 19. Assume $P_o$ and $P_t$ represents the original vertex point on the three-dimensional face model and the target location after deformation of the same point. The first index is the "link length," which considers each edge of the three-dimensional mesh as a link, and use the stages of links (an integral number) required to reach the original vertex as the measure of the propagation. FIG. 19 shows an example of deformation on the cheek. This definition also suits for areas with irregular meshes, such as the eye where moving upper lid should not necessarily affect the lower lid.

The second way to define the propagation area is to use pure Euclidian distance from the original vertex point. This index definition produces a regularly shaped effect regardless of mesh density. Two indexes for defining propagation area can be combined to produce optimal deformation results.

(2) compute vertices displacement within propagation area using Gaussian weight function: Assume the distance between the original and target positions of a vertex to be deformed is $d_t=\|P_o-P_t\|$. With the distance of propagation, there should be lesser degree of deformation on the vertices around the point $P_o$. We use a Gaussian function to represent a smooth transition of displacement propagation: $d_i=d_t*\exp(\|l(P_i)/s\|2)$, where $l(P_i)$ is the propagation index for the vertex i in the propagation area, s is a coefficient that can be adjusted to tune the performance of the deformation. Notice that $d_i$ can be calculated off-line as a look-up table, therefore real-time deformation performance can be achieved.

Figure 20:
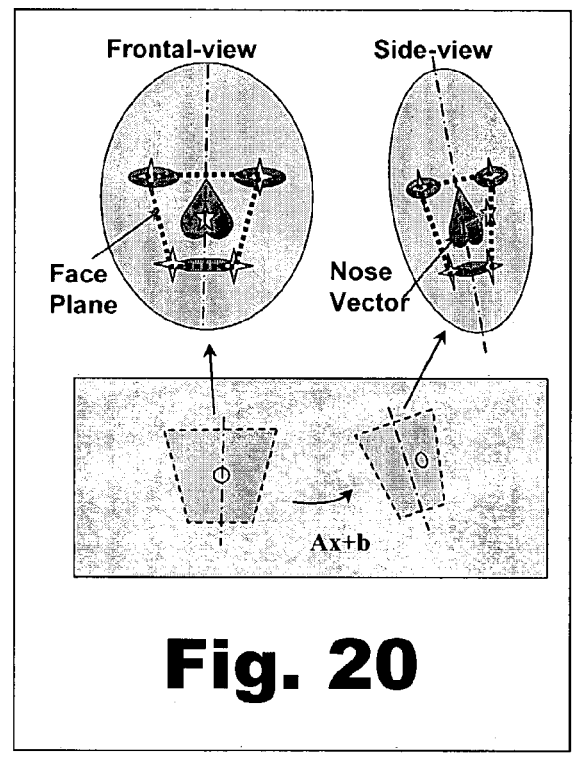
FIG. 20 illustrates a Face Plane and Nose Vector for use in embodiments of the present invention.

Pose Estimation: Given a flat two-dimensional facial image, we would like to estimate the pose of the face, i.e., the orientation angles under which the picture was taken. In the human facial features, centers of two eyes and outer corners of mouth form a plane (we call it the Face Plane) and the location of the nose tip is on the central bi-section plane of the face plane (symmetry). The projection of the nose tip towards the face plane forms a Nose Vector. When a face changes its pose, the spatial relationship of eyes, nose and mouth remains rigid. Therefore the pose change can be represented as an affine transformation. This is illustrated in FIG. 20.

If both images of a frontal and a side-view are given, the pose of the side-view image can be found by solving the parameters of the affine transformation. If only the side-view image is given, we will first use the line between eyes to correct the rotation on the pose. We will then make an assumption of the height of the nose tip (say, h), and use the discrepancy between the nose tip position and the central bi-section line (say, δ) to derive the pan angle α, i.e.: $\alpha=\sin^{-1}(\delta/h)$.

In the cases where more than two two-dimensional pictures are given, the least square iteration method can be used to refine the deformation of three-dimensional face model by obtaining more accurate pose estimation, three-dimensional positions of feature points, and less occluded visible area so more feature points can be used.

Deform three-dimensional face model based on single-view two-dimensional image: Two-dimensional photo offer cues to the three-dimensional shape of an object. However, a single-view-based three-dimensional face deformation provides an ill-defined result because the two-dimensional pixel location in a two-dimensional image cannot help us determine the three-dimensional depth of the corresponding point on the generic three-dimensional face model. With the assumption that face profiles are similar, the single-view two-dimensional image is still very useful to mold the three-dimensional face shape.

Figure 21:
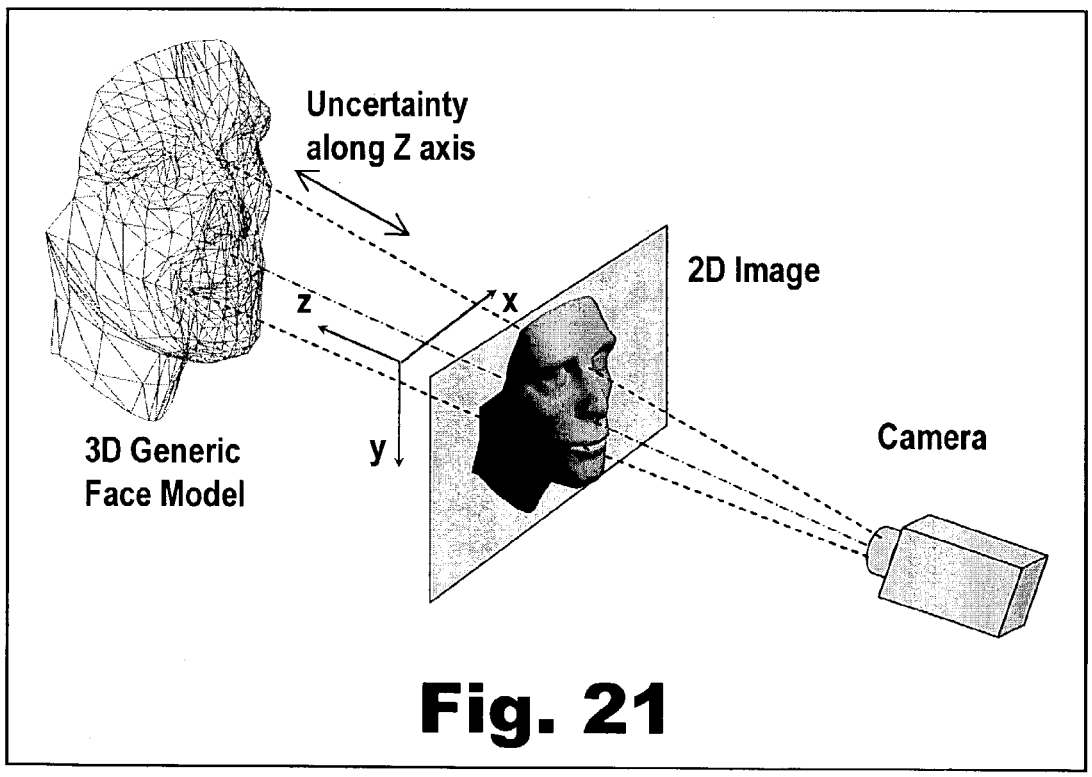
FIG. 21 illustrates the process of deforming a generic face model in (x, y) space and relying upon the depth profile of the generic face to represent the z-axis shape of the face.

The method uses the generic face profile as the standard depth profile for the face. Although it is not totally accurate, it is better then nothing. FIG. 21 illustrates the process of deforming a generic face model in (x, y) space and relying upon the depth profile of the generic face to represent the z-axis shape of the face.

Seamless texture mapping for three-dimensional face model: Accurate texture mapping on a three-dimensional model is important since it provides the face with more realistic complexion and tint. All three-dimensional objects (including the human face) self-occlude, i.e., some features of the object occlude others in any given orientation. Consequently, multiple two-dimensional images are preferred to provide data covering the entire face surface. The task of seamlessly integrating multiple two-dimensional images on to a deformed three-dimensional face model becomes very challenging. We next discuss the process of extracting texture maps from input two-dimensional photographs taken from various viewpoints and using those maps to render a seamless and realistic texture on the deformed three-dimensional face model.

Figure 22:
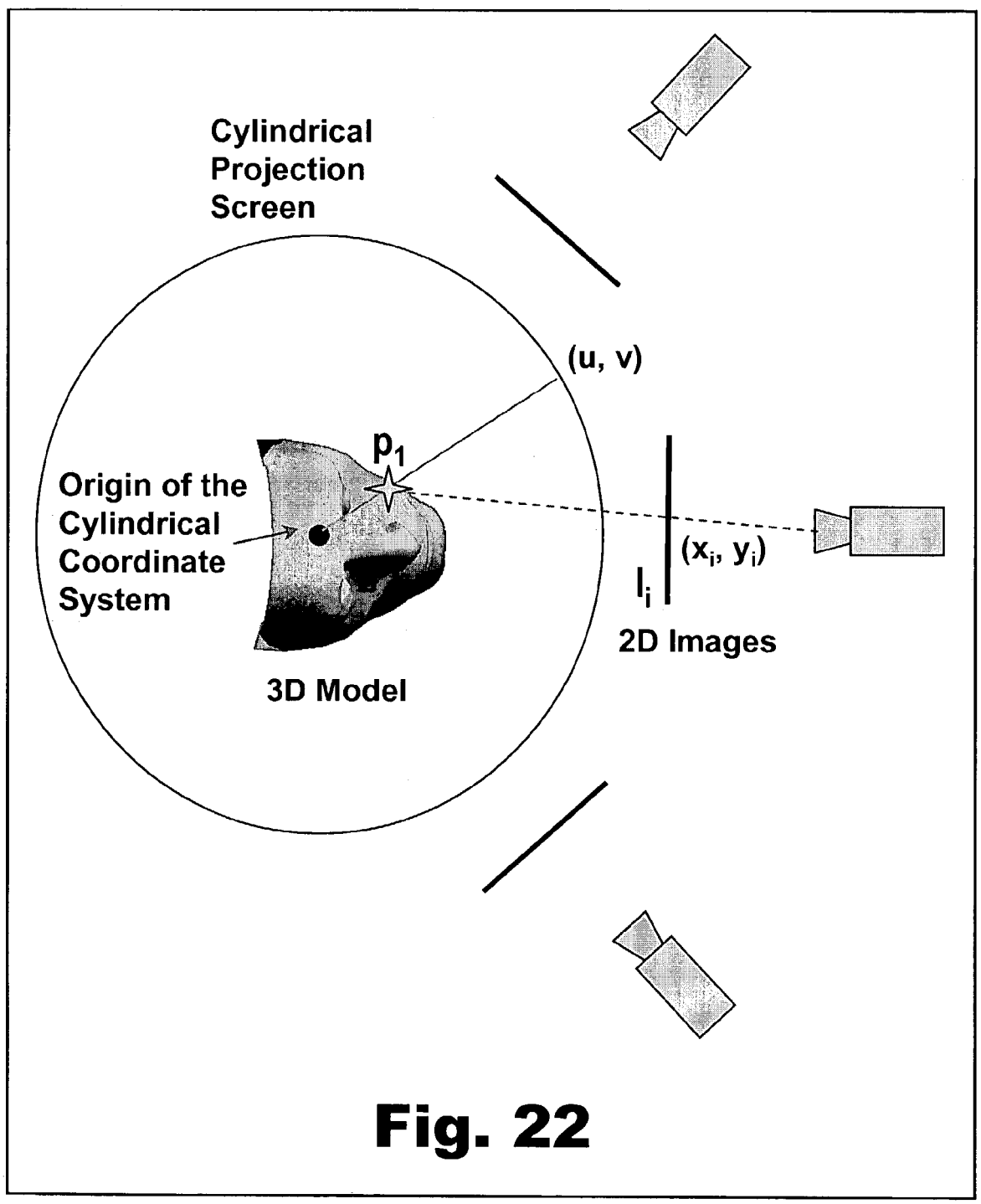
FIG. 22 illustrates a Cylindrical Projection Screen (CPS) coordinate system for use in embodiments of the present invention.
Figure 23:
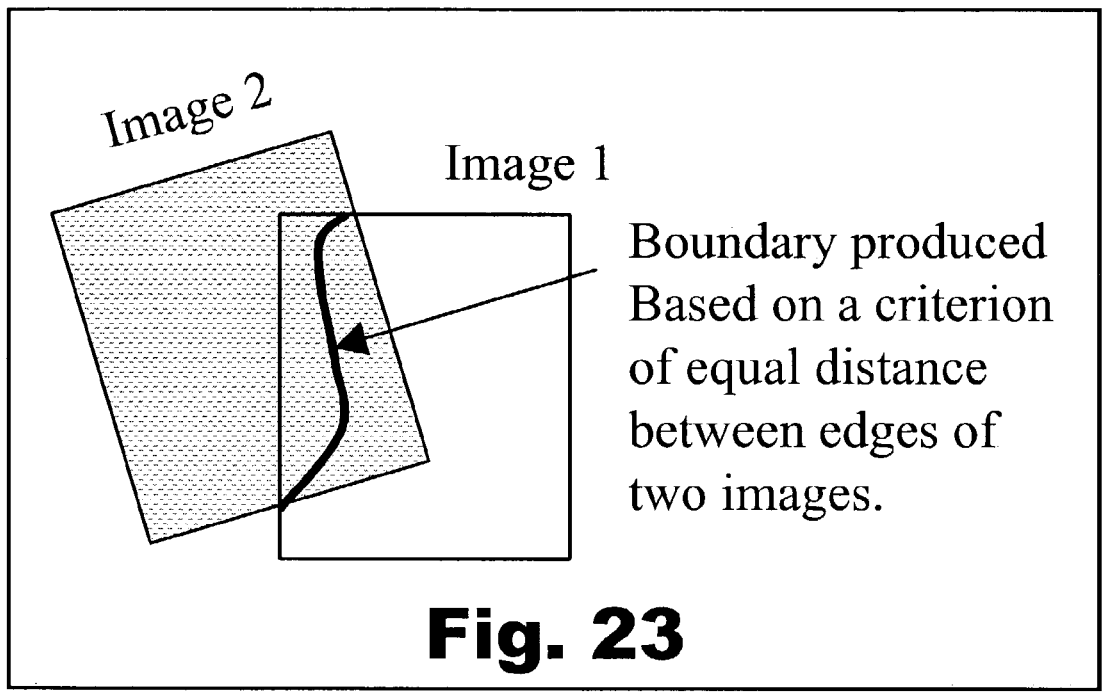
FIG. 23 illustrates an automatic boundary determination technique, called the "equal distance" which is used in an embodiment of the present invention.

Common coordinate system for integrating multiple texture maps: Since we will be dealing with multiple two-dimensional images taken from different view-angles, we need to define a common coordinate system within which these images are integrated. A "Cylindrical Projection Screen (CPS)" approach, as shown in FIG. 22, is preferred.

We first define a cylinder screen around the face model, the axis of the cylinder coincides with the vertical axis of the face model. For each of N two-dimensional images, we establish the pixel-wise projection relationship of the texture map and surface points on the three-dimensional model. For example, the pixel $(x_i, y_i)$ is projected onto a three-dimensional surface of the face model at the location $p_1$. We then make a cylindrical projection of the point $p_1$ onto the cylindrical projection screen (CPS) at the location (u, v). Carry out the same process for all the pixels for the image I, we will obtain a deformed two-dimensional image on the CPS.

Notice that the cylindrical projection of surface points on the generic three-dimensional model onto the CPS can be constructed prior to application of the generic model to a particular subject. Therefore, the entire CPS computation is very efficient.

For each of N images, we obtain the CPS texture map $T_i(u, v)$, i=1,2, . . . ,N. The integrated texture map is the weighted sum of all texture maps contributed by all images.

$$T(u, v) = \sum_{i=1}^{N} w_i(u, v)T_i(u, v), \sum_{i=1}^{N} w_i(u, v) = 1$$

The weights $w_i$ (u,v) in the integrated texture map calculation play an important role in "blending" multiple texture maps seamlessly into a single coherent texture map for the deformed three-dimensional face model. There are several desirable properties that a weight map should have: (1) Occlusion: If the facial surface point p corresponding to the texture map pixel (u,v) is not visible in the i-th image, the weight $w_i$ (u,v) should be zero; (2) Smoothness: The weights in each weight map should change in very smooth fashion to ensure a seamless blend between input images; (3) Surface Normal: If the normal of a surface point has large angle with respect to the viewing ray from j-th camera, the quality of the image pixel at this location is poor, therefore the weight associated with this texture contribution should be small.

Boundary Line Determination: The boundary between texture maps on the cylindrical projection screen has to be established automatically. An automatic boundary determination technique, called the "equal distance", is illustrated in FIG. 22. Given two overlapping three-dimensional images with arbitrary shapes on image edges, the ideal boundary line can be determined on which each point possesses an equal distance from two overlapping edges.

We have also considered the quality of image data when we decide the boundary. We define a confident factor for the image, based on the difference between the surface normal and the line-of-sight of camera view. Generally speaking, a texture map is more reliable and accurate in surface areas where the camera's viewing ray is close to the normal of the surface. In the areas where camera's viewing ray has large angle with the surface normal, the accuracy of texture data deteriorates. This geometric information can be used to define the confidence factor.

Combining the distance (denoted as "d") and Confident Factor (denoted as "c"), we obtain a weighted sum as the criterion to determine boundary: $D=w_1 d+w_2 c$ Determining a boundary line based on this criterion would result in a pair of texture images that meet along boundaries of nearly equal confidences and distances.

Figure 24:
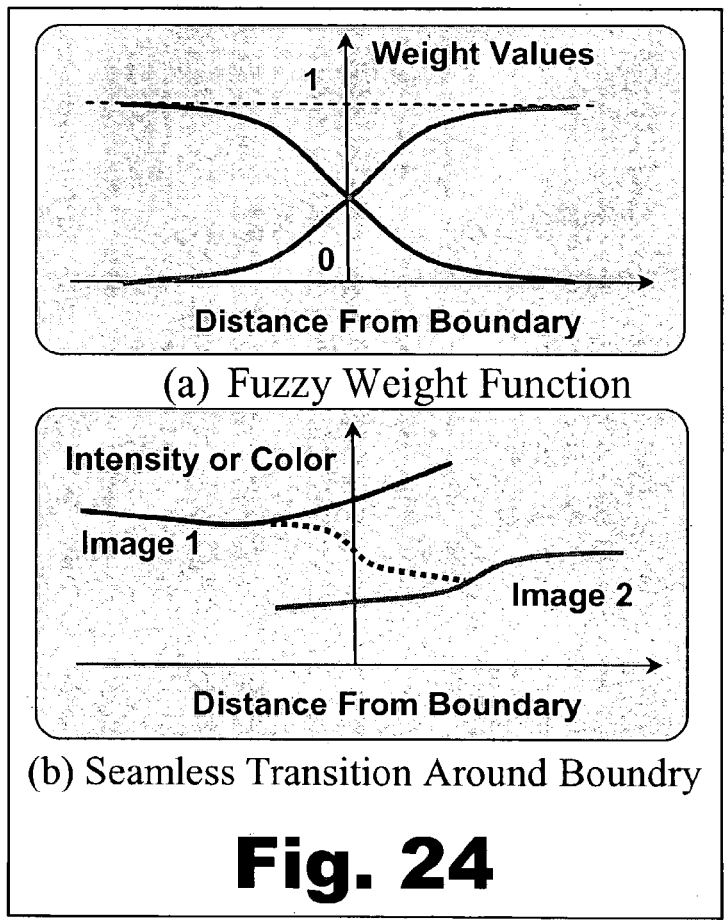
FIG. 24 illustrates the use of a fuzzy weight function to smooth out the boundary area on a combined texture map according to an embodiment of the present invention.

Fuzzy Weight Function: Once the boundary between the two surfaces is determined, we need to generate the merging texture with a smooth transition of intensity or color along the boundary. To alleviate the sudden jumps in surface curvature in the combined surface, we use a fuzzy weight function (FWF), similar to the fuzzy membership functions defined in fuzzy logic literature. All the weights $w_i$ are first set to 1 if the corresponding point p is visible in image i. We then smoothly ramp the values from 1 to 0 in the vicinity of boundaries using the fuzzy weight function. The merging texture is calculated based on the average intensity or color between two texture maps. Use of a fuzzy weight function can smooth out the boundary area on the combined texture map. This is illustrated in FIG. 24

Automatic Feature Detection: Facial feature detection primarily deals with the problem of locating the major facial features such as the eyes, nose, mouth, and face outline. Detecting major features is a pre-requisite for performing many face recognition tasks.

The vertical position of the eyes is initially determined by analyzing the vertical greylevel profile of the face. Eyes are searched for in the upper half of the face. Minima locations are determined using the first and second derivatives of the vertical face profile smoothed beforehand by an averaging one-dimensional filter. Minima located in a small neighborhood near others with less grey-level value than the former are discarded. The pair of the remaining minima whose distance in pixels lies in a predefined range with respect to the width of face is selected as the eyebrows and eyes.

The horizontal position of the eyes is determined in the similar fashion. The horizontal face profile is evaluated from a region whose height lies in the neighborhood of the initial vertical locations of the eyes. The maximum value of this profile represents the x-position of the face, whereas significant minima from either side of the center whose distances are almost equal indicate the x-position of the eyes. The initially determined eye locations are then refined by using template-based correlation.

Fit the generic face model to subject-specific two-dimensional image to obtain a three-dimensional face model: The purpose of the generic face model is to provide an efficient computation structure to represent face shape and deformation properties. It is not yet a subject-specific three-dimensional model. The parameters in the generic model can be easily modified to implement deformation required by fitting to specific subject's face data. In face identification applications, we developed a method to customize the generic model based on the three-dimensional surface images acquired by three-dimensional cameras.

Matching the three-dimensional locations of these feature points on the generic model with these extracted from the three-dimensional surface image data would allow a proper customization (scaling, rotation, translation, deformation, etc). The result of such customization will be a three-dimensional face model that has a structure of the generic model and the shape of the subject-specific images.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. An improved security surveillance process for comparing a plurality of 2D pictures of individuals comprising a first group with 2D pictures of individuals comprising a second group, said process comprising the steps of:
   generating 3D image data for facial pictures of each individual in said first group;
   generating a plurality of angularly offset 2D images from said 3D image data for each individual in said first group;
   generating a plurality of 2D picture images for individuals in a second group within a surveillance field; and comparing ones of said plurality of 2D images for an individual of said first group with a 2D image for an individual in said second group.

2. The process of claim 1 additionally including the step of identifying an individual of said second group based upon a best match of facial features with ones of said plurality of 2D images for each individual in said first group.

3. The process of claim 1 wherein said step of comparing comprises the step of optically or electronically comparing facial features data based upon triangular measurements of like data for members of said first and second group respectively.

4. An improved surveillance system for identifying an individual based upon previously recorded 3D facial image data sets for a plurality of individuals comprising a first group of individuals, said system comprising:
- a 3D camera for generating 3D facial image data of a plurality of individuals comprising said first group of individuals;
- means for generating a plurality of 2D images for each individual in said first group by slicing said 3D facial data for each individual at a plurality of predetermined angular offsets of said 3D image data;
- a 2D camera for generating pictures of a plurality of individuals comprising a second predetermined group within an optical field of surveillance; and
- a comparator for successively analyzing a plurality of 2D images of individuals of said first group with 2D images of individuals of said second group to identify a possible match of individuals included in both said first and second groups.

5. The improved surveillance system of claim 4 wherein said 2D image generator generates a plurality of 2D images for each individual in said first group, each image being at a predetermined angular offset to a selected reference point of said 3D data set and additionally including positioning means for selecting a predetermined angular offset for facial angles for each successive 2D image.

6. The improved surveillance system of claim 5 wherein said comparator comprises an optical or electrical comparator for comparing predetermined or selectable facial feature data of individuals in said first and second groups of individuals.

7. The improved surveillance system of claim 4 additionally including a memory for storing said plurality of 2D data images generated from said 3D data set for each individual in said first.

8. A method of automatically recognizing a human face, said method comprising:
- developing a three-dimensional model of each of a plurality of faces;
- generating a plurality of two-dimensional images based on said three-dimensional models, wherein said two-dimensional images illustrate the face of a model from different angles;
- developing a database of said two-dimensional images based on said three-dimensional facial models; and
- comparing a two-dimensional input image of a target individual with images in said database so as to recognize said target individual.

9. The method of claim 8, wherein said two-dimensional images illustrate the face of a model in different lighting conditions.

* * * * *